Patented July 5, 1949

2,474,931

UNITED STATES PATENT OFFICE 2,474,931

QUINOLINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe, and Walter F. Holcomb, Detroit, Mich., assignors to Parke, Davis & Company, Detroit, Mich., a corporation of Michigan No Drawing. Application January 16, 1947, Serial No. 722,474

13 Claims. (Cl. 260—286)

This invention relates to certain new and useful quinoline compounds and to methods for obtaining the same. More particularly, the invention relates to quinoline compounds having the following formula for the free base,

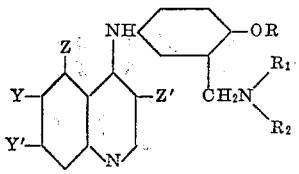

where R is a methyl or ethyl radical, $R_1$ is an alkyl radical containing 1 to 6 carbon atoms inclusive, $R_2$ is hydrogen or an alkyl radical containing 1 to 6 carbon atoms inclusive and when taken together with —N< and $R_1$ forms a saturated six membered heterocyclic ring such as piperidine, morpholine and thiomorpholine, Y and Y' are the same or different substituents and represent hydrogen, chlorine, bromine, a lower alkyl radical or a lower alkoxy radical and Z and Z' are the same or different substituents and represent hydrogen or a methyl radical.

These new compounds are useful therapeutic agents and, in general, they are characterized by their toxicity to plasmodia. These compounds may be used either in the form of their bases or their salts with organic and inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene bis disalicylic acid.

The compounds of the present invention may be prepared by the reaction of a substituted amino phenolic ether of the formula,

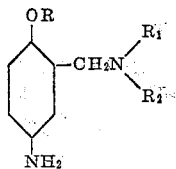

with a 4-haloquinoline compound of the formula,

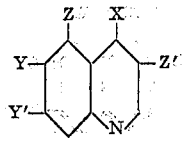

where R, $R_1$, $R_2$, Y, Y', Z and Z' have the same significance as given above and X is a chlorine or bromine atom.

The reaction may be carried out by reacting approximately equimolar quantities of the 4-haloquinoline and the substituted amino phenolic ether in a suitable solvent. Such solvents are, in general, water, water-miscible organic solvents and mixtures of water and water miscible organic solvents. Some of the water-miscible solvents which may be used are low molecular weight alcohols such as methanol, ethanol and isopropanol, low molecular weight ketones such as acetone and methyl ethyl ketone, and ethers such as dioxane and ethylene glycol monoethyl ether.

We prefer to carry out the above reaction in the presence of an acidic catalyst. Such catalysts are dilute and concentrated organic acids, phenols and dilute inorganic acids. Some of the organic acids which may be used are acetic, propionic, butyric and the like acids. When the reaction is carried out in the presence of a concentrated organic acid or a phenol, the acid or phenol serves both as the catalyst and as the solvent. Some of the phenols which we may employ to effect the reaction are phenol, o-cresol, p-cresol, mixed cresols and the like. The inorganic acids which we use are, in general, mineral acids such as hydrochloric, hydrobromic, sulfuric, phosphoric and the like acids.

The invention is illustrated by the following examples.

*Example 1.—4-(3'-diethylaminomethyl-4'-methoxyanilino)-7-chloroquinoline*

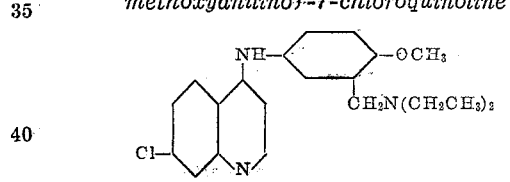

80.4 g. of 4,7-dichloroquinoline is added to a solution of 116 g. of 2-diethylaminomethyl-4-aminoanisole dihydrochloride in 350 cc. of methanol and the mixture refluxed for six hours. The solution is concentrated to about one-half volume and diluted with an equal volume of water. The mixture is made alkaline with concentrated ammonium hydroxide and the gray colored product which separates collected by filtration. The crude 4-(3'-diethylaminomethyl-4'-methoxyanilino)-7-chloroquinoline is washed with acetone and alcohol and purified by recrystallization from isopropanol; M. P. 200–3° C.

The free base may be converted to the dihydrochloride salt by dissolving it in acetone and treating the resulting solution with an excess of alcoholic hydrogen chloride. The dihydrochloride salt which separates from the solution is collected and purified by recrystallization from isopropanol.

*Example 2.—3 - methyl - 4- ( 3' - diethylaminomethyl-4'-methoxyanilino) -7-chloroquinoline*

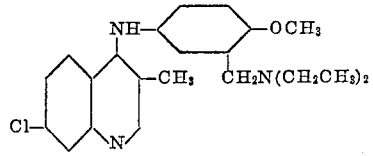

10.6 g. of 3-methyl-4,7-dichloroquinoline is added to a solution of 14.2 g. of 2-diethylaminomethyl-4-aminoanisole dihydrochloride in 85 cc. of methanol and the resulting mixture heated on a steam bath for six hours until evaporation of the solvent. An equal volume of water is added to the residue and the mixture made alkaline with ammonium hydroxide. The dark brown precipitate which separates is collected and dissolved as completely as possible in hot acetone. (The insoluble material is discarded.) The acetone solution is cooled, the precipitate collected and purified by recrystallization from ethyl acetate; M. P. 192–5° C.

*Example 3.—4-(3'-diethylaminomethyl-4'-ethoxyanilino)-7-chloroquinoline*

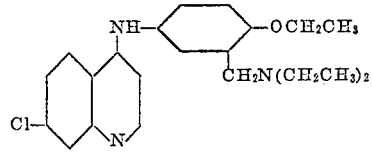

15.1 g. of 4,7-dichloroquinoline is added to a methanol solution containing 22.8 g. of 2-diethylaminomethyl-4-aminophenetole dihydrochloride and the mixture heated for six hours on a steam bath. The light yellow precipitate of the dihydrochloride of 4-(3'-diethylaminomethyl - 4' - ethoxyanilino) - 7 - chloroquinoline which separates is collected and purified by recrystallization from isopropanol; M. P. 245–7° C.

*Example 4.—3,6-dimethyl-4-(3'-di-n-propylaminomethyl-4'-ethoxyanilino)-7-bromoquinoline*

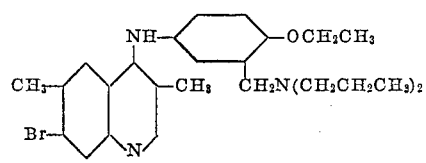

13 g. of 2-di-n-propylaminomethyl-4-aminophenetole is dissolved in 75 cc. of 50% ethanol by adding sufficient dilute hydrochloric acid to bring the pH to about 4. 13.5 g. of 3,6-dimethyl-4-chloro-7-bromoquinoline is added, the mixture heated for four hours, cooled and made alkaline with concentrated ammonium hydroxide. The precipitated free base of the desired product is extracted with ether, the combined ether extracts dried over potassium carbonate and the drying agent removed by filtration. The new quinoline compound is isolated and purified through its dihydrobromide salt. This may be accomplished by treating the ether solution of the free base with an excess of dry hydrogen bromide, collecting the salt and purifying it by recrystallization from absolute ethanol or methanol.

*Example 5.—4-(3'-di-n-butylaminomethyl-4'-ethoxyanilino)-6-methoxyquinoline*

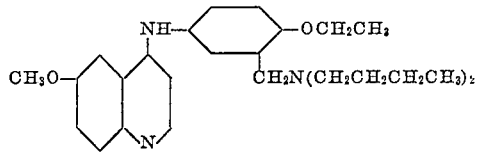

19.3 g. of 4-chloro-6-methoxyquinoline is added to a solution of 28 g. of 2-di-n-butylaminomethyl-4-aminophenetole in 200 cc. of water acidified to a final pH of 4 with dilute hydrochloric acid. The mixture is refluxed for four hours, cooled and made alkaline with concentrated ammonium hydroxide. The free base of the desired product which separates is collected and dissolved in ether. The ether solution is dried and after charcoaling, treated with an excess of alcoholic hydrogen chloride. The dihydrochloride salt which precipitates is collected and purified by recrystallization from isopropanol.

*Example 6.—4-(3'-N-piperidylmethyl-4'-methoxyanilino)-5,7-dimethylquinoline*

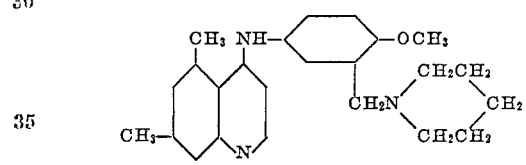

A mixture consisting of 29.3 g. of 2-N-piperidylmethyl-4-aminoanisole dihydrochloride and 19 g. of 4-chloro-5,7-dimethylquinoline in 200 cc. of ethanol is heated on a steam bath until the solvent has evaporated. The residue is stirred with acetone and the dihydrochloride of the crude product which fails to dissolve, collected and purified by recrystallization from isopropanol.

The free base may be obtained from the dihydrochloride by dissolving the salt in water and adding an excess of concentrated ammonium hydroxide. The solid base which separates from the solution is collected and purified by recrystallization from alcohol.

*Example 7.—4-(3'-N-morpholinylmethyl-4'-methoxyanilino)-6,7-dimethoxyquinoline*

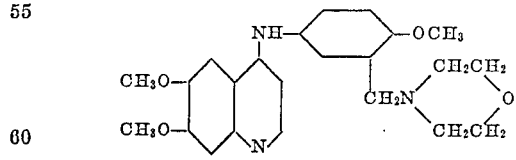

22.3 g. of 4-chloro-6,7-dimethoxyquinoline is added to a methanol solution containing 38.4 g. of 2-N-morpholinylmethyl-4-aminoanisole dihydrobromide and the resulting mixture heated on a steam bath for four hours. The reaction mixture is cooled, diluted with a small amount of acetone and the crude dihydrobromide salt of the desired product removed by filtration. The salt may be purified by recrystallization from methanol or it may be converted to the free base by dissolving it in water and making the solution alkaline with ammonium hydroxide. The solid free base is collected and purified by recrystallization from alcohol.

*Example 8.—4-(3'-N-piperidylmethyl-4'-ethoxyanilino)-6,7-dichloroquinoline*

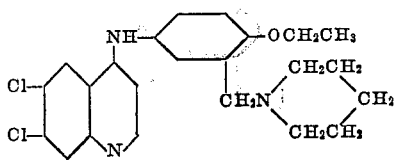

A mixture consisting of 23.5 g. of 2-N-piperidylmethyl-4-aminophenetole and 23 g. of 4,6,7-trichloroquinoline in 200 cc. of 50% methanol is acidified to pH 4 by the addition of dilute hydrochloric acid and the resulting mixture heated on a steam bath for six hours. The mixture is cooled, diluted with water, made alkaline with concentrated ammonium hydroxide and the crude free base of the desired 4-(3'-N-piperidyl-4'-ethoxyanilino)-6,7-dichloroquinoline which separates, collected. The crude base can be purified by recrystallization from isopropanol or it may be converted to one of its acid addition salts by dissolving it in ether or alcohol and treating the solution with an appropriate acid.

*Example 9.—4-(3'-n-propylaminomethyl-4'-methoxyanilino)-5-methyl-6-bromoquinoline*

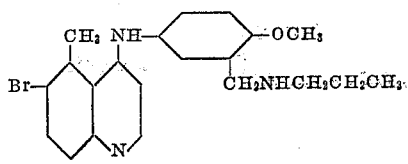

22.1 g. of 4-chloro-5-methyl-6-bromoquinoline is added to an absolute ethanol solution of 26.6 g. of 2-n-propylaminomethyl-4-aminoanisole dihydrochloride and the mixture heated for four hours, cooled and the dihydrochloride of the desired product removed by filtration. The crude hydrochloride is dissolved in water, excess ammonium hydroxide added and the gummy precipitate of the free base collected. The base is dissolved in acetone and an excess of alcoholic hydrogen chloride added. The dihydrochloride salt is collected and purified by recrystallization from isopropanol.

*Example 10.—3-methyl-4-(3'-iso-propylaminomethyl-4'-ethoxyanilino)-7-bromoquinoline*

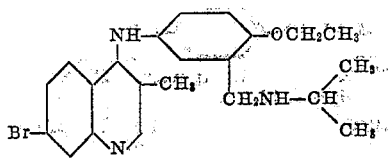

25 g. of 3-methyl-4-chloro-7-bromoquinoline is added to a solution of 20.7 g. of 2-isopropylaminomethyl-4-aminophenetole in 500 cc. of water at pH 4 with hydrochloric acid. The mixture is refluxed for six hours, cooled and made alkaline with concentrated ammonium hydroxide. The crude free base which separates, is collected, dried and dissolved in acetone. The acetone solution is treated with an excess of alcoholic hydrogen chloride and the dihydrochloride salt which separates collected and purified by recrystallization from absolute ethanol.

*Example 11.—4-(3'-iso-butylaminomethyl-4'-methoxyanilino)-7-chloroquinoline*

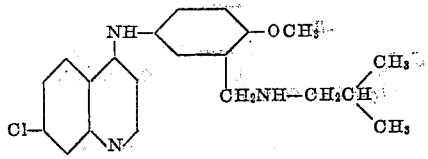

9.9 g. of 4,7-dichloroquinoline is added to a methanol solution containing 14.0 g. of 2-iso-butylaminomethyl-4-aminoanisole dihydrochloride and the resulting mixture heated on a steam bath for six hours. The solid residue is stirred with acetone and the solid which fails to dissolve collected. The crude dihydrochloride hemi-hydrate of 4-(3'-iso-butylaminomethyl-4'-methoxyanilino)-7-chloroquinoline is purified by recrystallization from isopropanol and ethanol; M. P. 192–4° C.

*Example 12.—4-(3'-n-amylaminomethyl-4-methoxyanilino)-7-chloroquinoline*

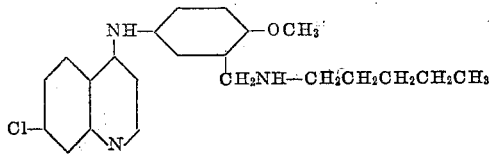

11.9 g. of 4,7-dichloroquinoline is added to a solution of 30.5 g. of 2-n-amylaminomethyl-4-aminoanisole dihydrochloride in 150 cc. of methanol and the mixture heated until a yellow precipitate forms. The dihydrochloride of the desired product is collected and purified by recrystallization from isopropanol and methanol; M. P. 286–8° C.

The substituted aminomethyl 4-amino-phenolic ethers used as starting materials in the practice of the present invention may be prepared by reacting a primary or secondary amine with a 2-ahlomethyl-4-nitro-phenolic ether and then reducing the substituted 2-aminomethyl-4-nitro-phenolic ether so obtained to the corresponding amine as described in our copending application, Serial No. 710,418, filed November 18, 1946.

The 4-haloquinolines which are used as starting materials may be prepared from the corresponding 4-hydroxyquinolines by methods well-known to the art.

This application is a continuation-in-part of our copending application, Serial No. 539,990, filed June 12, 1944, now Patent No. 2,428,355 issued October 7, 1947.

What we claim as our invention is:

1. A compound of the class consisting of a free base and its acid addition salts, said free base having the formula,

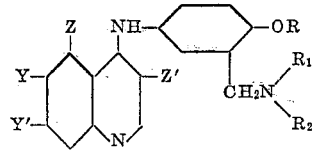

where R is a member of the class consisting of methyl and ethyl radicals, $R_1$ is an alkyl radical containing 1 to 6 carbon atoms inclusive, $R_2$ is a member of the class consisting of hydrogen and alkyl radicals containing the same number of carbon atoms as $R_1$ and further members in which $R_1$ and $R_2$ taken together with —N< form a saturated six-membered heterocyclic ring, Y and Y' are members of the class consisting of hydrogen, chlorine, bromine, lower alkyl radicals and lower alkoxy radicals and Z and Z' are members of the class consisting of hydrogen and methyl radicals.

2. A compound of the class consisting of a free base and its acid addition salts, said free base having the formula,

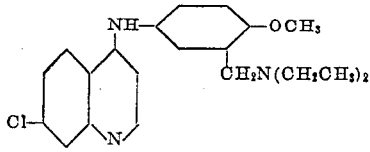

3. A compound of the formula,

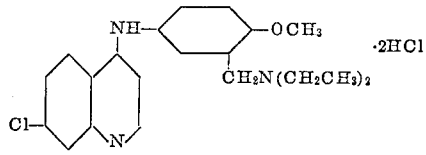

4. A compound of the class consisting of a free base and its acid addition salts, said free base having the formula,

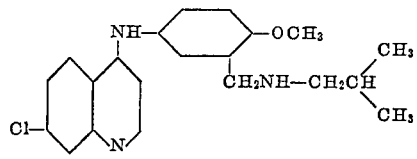

5. A compound of the formula,

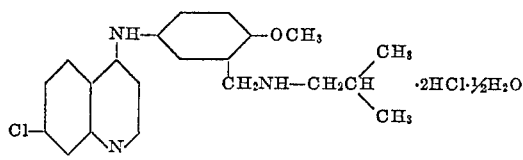

6. A compound of the class consisting of a free base and its acid addition salts, said free base having the formula,

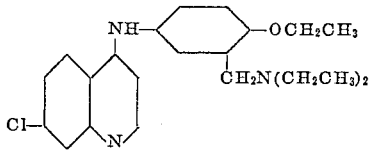

7. A compound of the formula,

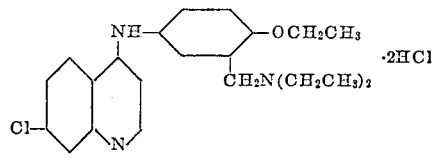

8. Process for obtaining a compound of the formula,

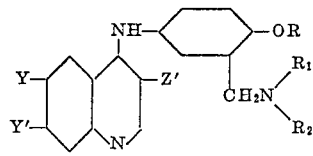

which comprises reacting a 4-haloquinoline compound of the formula,

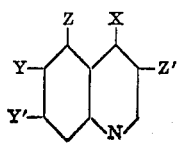

with a substituted amino phenolic ether of the formula,

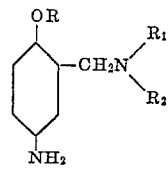

where R is a member of the class consisting of methyl and ethyl radicals, $R_1$ is an alkyl radical containing 1 to 6 carbon atoms inclusive, $R_2$ is a member of the class consisting of hydrogen and alkyl radicals containing the same number of carbon atoms as $R_1$ and further members in which $R_1$ and $R_2$ taken together with —N< form a saturated six-membered heterocyclic ring, Y and Y' are members of the class consisting of hydrogen, chlorine, bromine, lower alkyl radicals and lower alkoxy radicals, Z and Z' are members of the class consisting of hydrogen and methyl radicals and X is a member of the class consisting of chlorine and bromine atoms.

9. Process for obtaining a compound of the formula,

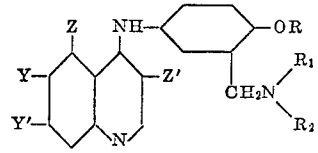

which comprises reacting a 4-haloquinoline compound of the formula

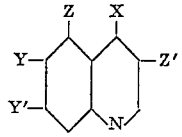

with a substituted amino phenolic ether of the formula,

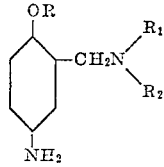

in the presence of an acidic agent selected from the class consisting of lower fatty acids, phenols and dilute inorganic acids, where R is a member of the class consisting of methyl and ethyl radicals, $R_1$ is an alkyl radical containing 1 to 6 carbon atoms inclusive, $R_2$ is a member of the class consisting of hydrogen and alkyl radicals containing the same number of carbon atoms as $R_1$ and further members in which $R_1$ and $R_2$ taken together with —N< form a saturated six-membered heterocyclic ring, Y and Y' are members of the class consisting of hydrogen, chlorine, bromine, lower alkyl radicals and lower alkoxy radicals, Z and Z' are members of the class consisting of hydrogen and methyl radicals and X is a member of the class consisting of chlorine and bromine atoms.

10. Process for obtaining a compound of the formula,

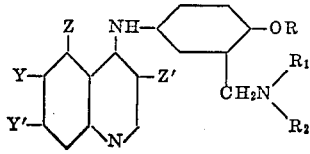

which comprises reacting a 4-haloquinoline compound of the formula,

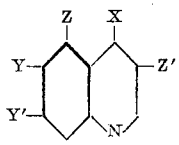

with a substituted amino phenolic ether of the formula,

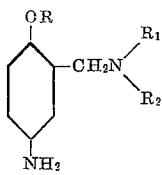

in the presence of a dilute mineral acid, where R is a member of the class consisting of methyl and ethyl radicals, $R_1$ is an alkyl radical containing 1 to 6 carbon atoms inclusive, $R_2$ is a member of the class consisting of hydrogen and alkyl radicals containing the same number of carbon atoms as $R_1$ and further members in which $R_1$ and $R_2$ taken together with —N< form a saturated six-membered heterocyclic ring, Y and Y' are members of the class consisting of hydrogen, chlorine, bromine, lower alkyl radicals and lower alkoxy radicals, Z and Z' are members of the class consisting of hydrogen and methyl radicals and X is a member of the class consisting of chlorine and bromine atoms.

11. Process for obtaining a compound of the formula,

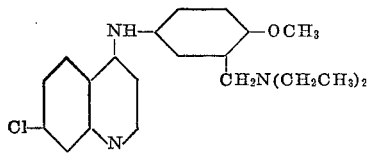

which comprises reacting 4,7-dichloroquinoline with 2-diethylaminomethyl-4-aminoanisole in the presence of a dilute mineral acid.

12. Process for obtaining a compound of the formula,

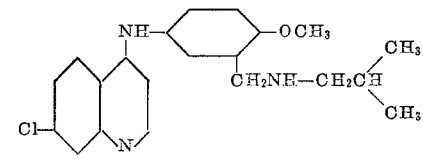

which comprises reacting 4,7-dichloroquinoline with 2-isobutylaminomethyl-4-aminoanisole in the presence of a dilute mineral acid.

13. Process for obtaining a compound of the formula,

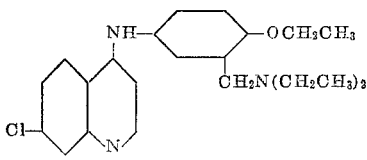

which comprises reacting 4,7-dichloroquinoline with 2-diethylaminomethyl-4-aminophenetole in the presence of a dilute mineral acid.

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 2,233,970 | Andersag et al. | Mar. 4, 1941 |
| 2,419,199 | Burckhalter et al. | Apr. 22, 1947 |

OTHER REFERENCES

Braun: Berichte, vol. 70, pp. 979–993 (1937).